Nov. 29, 1966   YUKIHIRO TAKATSU   3,288,457
SPRING MEANS
Filed Oct. 6, 1964    2 Sheets-Sheet 1
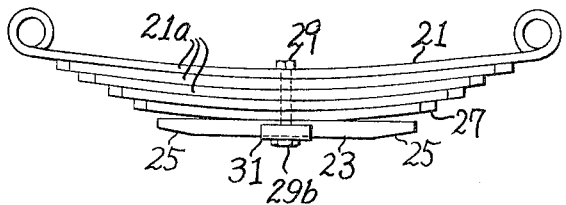
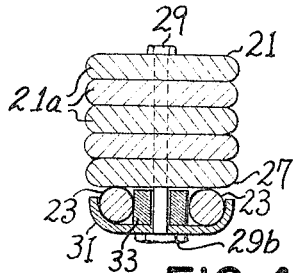
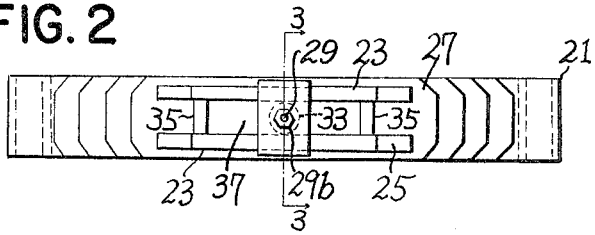
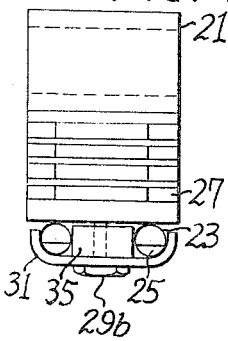
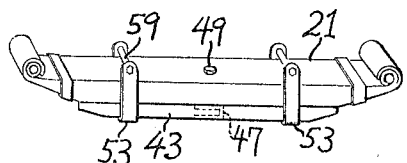
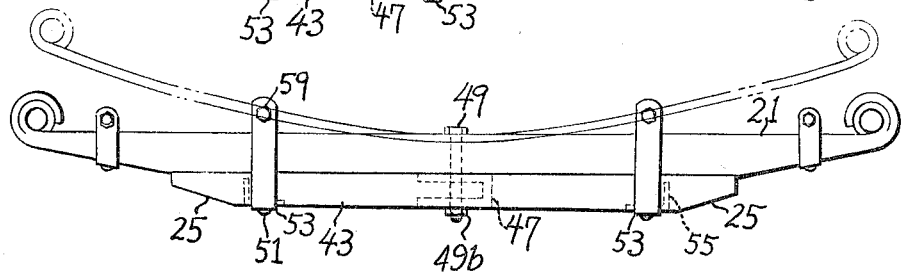
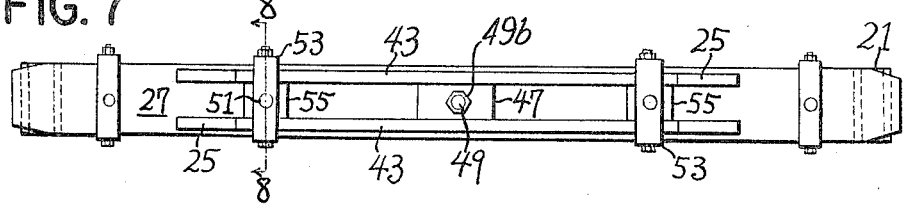
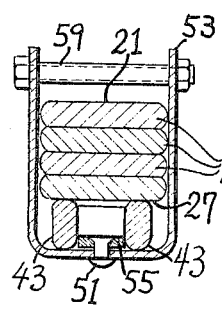
Yukihiro Takatsu
INVENTOR.

Nov. 29, 1966  YUKIHIRO TAKATSU  3,288,457
SPRING MEANS

Filed Oct. 6, 1964  2 Sheets-Sheet 2

*Yukihiro Takatsu*
INVENTOR.

United States Patent Office 3,288,457
Patented Nov. 29, 1966

3,288,457
SPRING MEANS
Yukihiro Takatsu, Yokohama-shi, Japan, assignor to Nippon Halsujo Kabushiki Kaisha, NHK Spring Co., Ltd., Yokohama-shi, Japan
Filed Oct. 6, 1964, Ser. No. 401,817
4 Claims. (Cl. 267—48)

This invention relates to an improvement in a spring means, and particularly to a spring means for heavy load carring wheels of a vehicle such as the rear wheels of a truck.

Figure 12:
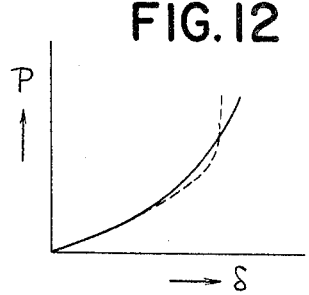

In general, a progressive spring has such a load characteristic curve as is shown in the solid line in FIG. 12. In order to increase the spring constant in accordance with an increase in load and at the same time to equalize the force applied to a main spring with that applied to an auxiliary spring at the maximum load, such an auxiliary spring must have leaves with an appreciably high rigidity. To this end, an appreciably thick flat steel leaf is required. However, practically speaking, the thickness of a flat steel leaf is limited so that, in order to give the auxiliary spring the desired characteristic, more and more leaves are required to be laminated to give the necessary rigidity to the auxiliary spring.

If the problem with respect to stress is satisfied, a small number of thick flat spring leaves is more advantageous than a large number of thin flat spring leaves. This fact will be illustrated by comparing one sheet of thick flat steel with two sheets of thin flat steel as follows:

If a spring constant required for an auxiliary spring is $2kn$, a one-leafed spring is indicated by a suffix 1, and a two-leafed spring is indicated by a suffix 2, the length $L$ of the second leaf of the two-leafed spring is 0.6 of that of the first leaf so as to give a uniform stress thereto, and these are equal, $$kn = 3EI_1/L^3 \quad (1)$$

in case of the one-leafed spring, and $$kn = 3EI_2/(L^3 \times 0.568) \quad (2)$$

in case of the two-leafed spring. From (1) and (2)

$$I_1 = I_2/0.568$$

Hence $$b_1 t_1^3/12 = (b_2 t_2^3/12) \times (1/0.568)$$

Since $b_1 = b_2$, $$0.568 = (t_2/t_1)^3$$

or $$0.828 = t_2/t_1$$

or $$t_2 = 0.828 t_1 \quad (3)$$

Now the weights will be compared with each other by way of comparing volumes:

The volume of one-leafed spring $$V_1 = tbL \quad (4)$$

and the volume of two-leafed spring $$V_2 = t_2 bL + tb \times 0.6L$$
$$= 0.828 t_1 bL(1+0.6)$$
$$= 1.325 t_1 bL \quad (5)$$

From (4) and (5), $$V_2 V_1 = 1.325$$

or $$V_1 V_2 \doteq 3/4.$$

That is to say, in case of a one-leafed spring, it merely weighs about 3/4 of that of a corresponding two-leafed spring. Thus it is to be understood that in view of the weight, it is more advantageous to adopt a less number of thicker leaves than a more number of thinner leaves in order to obtain a leaf spring having a desired spring constant. However, practically speaking, because of limits set on the dimensions of flat steels for spring use, desirably thick flat steel is unavailable, so that it is rather usual to be forced to design such a leaf spring by laminating more leaves one upon another that is unduly heavy. Thus it has been unavoidable that the weight and, accordingly, the material cost and manufacturing expense are unreasonably high.

One object of this invention is to provide a spring means which is able to overcome the drawbacks as referred to above.

Another object of this invention is to provide a spring means which makes more comfortable the driving of a truck or the like.

Still another object of this invention is to provide a spring means which is more wear resistant so as to render a truck or the like on which it is used more durable.

Further another object of this invention is to provide a spring means which does not creak.

Briefly stated in accordance with one aspect of this invention, there is provided a spring means comprising a main spring and an auxiliary spring. The main spring comprises a number of leaf springs laminated one upon another in a well known manner. The auxiliary spring, so-called "helper" in the art, in accordance with the present invention comprises a number of bar steel springs hereinafter described. The bar may be either a round bar or a round bar having lateral vertical flat sides. The bar steel springs vertically have less curvature than the curvature of the leaf springs, are arranged longitudinally side by side at intervals, are fastened integrally with each other by uniting means at the proximity of the both longitudinal ends and at the center of the auxiliary spring, and are attached to the main spring in such a manner that the centers of the bar springs are contacted with the central bottom surface of the lowermost one of the leaf springs.

Figure 9:
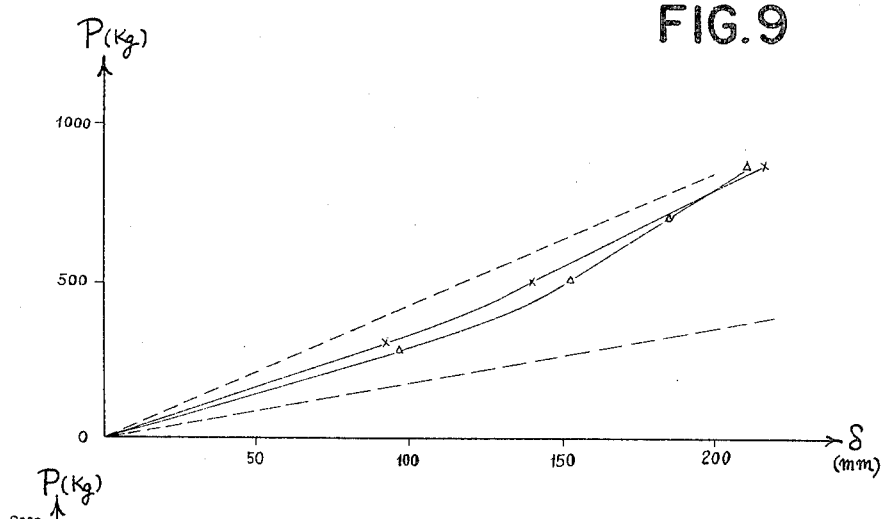
Figure 10:
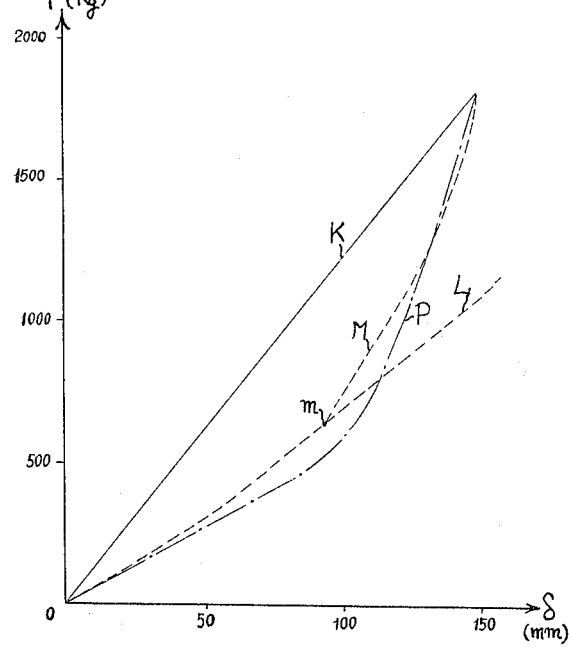
Figure 11:
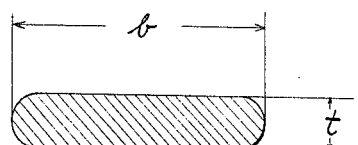

The invention will be better understood and other objects and additional advantages of the invention will become apparent upon perusal of the following description taken in connection with the drawings in which:

FIG. 1 is a side elevational view of a spring embodying this invention;
FIG. 2 is a bottom view thereof;
FIG. 3 is a cross-sectional view, enlarged, taken along lines 3—3 of FIG. 2;
FIG. 4 is an enlarged front elevational view thereof;
FIG. 5 is a perspective view of another embodiment of this invention;
FIG. 6 is a side elevational view thereof;
FIG. 7 is a bottom view thereof;
FIG. 8 is a cross-sectional view, enlarged, taken along lines 8—8 of FIG. 7;
FIG. 9 is a graph of the load charactaeristics both of the springs of the invention and of certain prior art springs;
FIG. 10 is graph illustrating the relation of deflection to load;
FIG. 11 is a cross-sectional view of a round bar having lateral vertical flat sides; and
FIG. 12 is a graph similar to FIG. 9 but showing another embodiment.

Referring more particular to FIGS. 1 through 4, a main spring 21 is shown comprising a number of leaf springs 21a. An auxiliary spring, the so-called helper, comprises two round bar steel springs 23. The round bar springs 23 vertically have less curvature than the curvature of the leaf springs 21a of the main spring 21. Both ends of the round bar steel spring 23 are tapered horizontally at the lower side 25 whereby the auxiliary spring is made more easily deflectable when it comes into contact with the lowermost leaf spring 27 of the main spring 21. The two round bar steel springs 23 are arranged longitudinally side by side with a space between. A center bolt 29 is provided extending through the leaves 21a of the main spring 21 and a channel adapting member 31 engaged by a nut 29a on the bolt 29 which holds the two round bar steel springs 23 in such a manner that the centers of the latter are contacted with the central bottom surface of the lowermost leaf spring 27. The center bolt 29 is freely inserted through a collar 33 between the lowermost leaf spring 27 and the channel adapting member 31. It is to be noted that the collar 33 is slightly shorter than the diameter of the round bar steel spring 23 so that the bar steel spring 23 contacts the lowermost leaf spring 27 directly and so that it can be inserted in the space between the round bar steel springs 23. The ends of the round bar steel springs 23 are spaced from each other by means of spacers 35, respectively. By virtue of the space 37 provided between the two round bar steel springs 23, it is possible to keep the upper surfaces of the round bar steel springs 23 free from dust naturally and also to provide the space for the center bolt 29 and the collar 33. By virtue of the spacers 35, the longitudinal ends of the round bar steel springs 23 are held and prevented from any individual motion.

The embodiment just set forth will be compared with the prior art. In the leaf springs in accordance with prior art, those which have only one auxiliary spring are most advantageous in view of the weight advantage as set forth hereinbefore. Such a leaf spring will now be compared with this embodiment just described.

If a spring constant required for the auxiliary springs is $2kn$ and the suffix for the flat steel is $f$, and for the round bar steel is $r$, $$kn = 3EI_f/L^3 \quad (6)$$

in case of flat steel as (1), and $$kn = 3E \times 2I_r/L^3 \quad (7)$$

in case of round bar steel. From (6) and (7)

$$I_f = 2I_r$$

Hence $$bt^3/12 = 2 \times \pi d^{40} d^4/64$$

Hence $$bt^3 = 3\pi d^4/8 \quad (8)$$

If the weights are compared with each other by comparing volumes:

The volume of the flat steel, $V_f = tbL$ and the volume of the round bar steel, $$V_r = 2 \times \pi d^2 L/4$$

Hence $$V_f/V_r = 2tb/\pi d^2 \quad (9)$$

From (8) and (9)

$$V_f/V_r = 3/4 \times d^2/t^2$$

Therefore, if $$d \doteq 1.153t,$$
$$V_f = V_r$$

Now in case $d = 1.153t$, from Equation 8, $$bt^3 = 3/8 \times \pi \times (1.153t)^4,$$
$$bt^3 = 3/8 \times \pi \times 1.755t^4,$$

Hence $$b/t = 2.09$$

Meantime, in view of the dimension of the available flat steel, $b/t > 5$. Therefore, the case $d = 1.153t$ cannot be, but necessarily $d > 1.153t$. Therefore, $V_f > V_r$. That is to say, the use of flat steel is necessarily disadvantageous comparing with the use of round bar steel.

The above comparison has been made for the most advantageous case of flat steel or for such a case where only one flat steel auxiliary spring is used. However, practically speaking, more than two flat steel springs are used so that the weight becomes more than 4/3. Therefore, comparing with this embodiment, the value of $d$ in flat steel becomes at least more than $4/3 \times 1.153 \doteq 1.55$. Thus it will be seen that this embodiment is far advantageous.

Other than the above comparison from the point of view of weight, there is a great advantage for round bar steel so that such a material having a large value for I is available and desirable load characteristics may be given to a progressive spring. In FIG. 9 the above comparison is illustrated. The dotted line in FIG. 12 represents a characteristic achieved by the embodiment. While the prior art springs have been strictly restricted in their load characteristics, such restrictions do not obtain with the springs in accordance with the present invention.

Further comparison will now be made referring to some dimensions for the practical design of progressive springs as follows:

If the following conditions, $$2L = 900 \text{ mm.}$$
$$b = 50 \text{ mm.}$$
$$2P_{max} = 1200 \text{ kg.}$$

a load whereby the auxiliary spring first comes in contact with the main spring $\cong 250$ kg, $$km. = 5.5 \text{ kg./mm.}$$
$$km. + h = 17 \text{ kg./mm.}$$

and $$p_{max} = 85 \text{ kg./mm.}$$

are to be satisfied in a design, reference may be had to Table I.

TABLE I

| Leaf No. | Auxiliary Spring of Round Bar Steel is provided | | | Auxiliary Spring of Flat Steel is provided | | |
|---|---|---|---|---|---|---|
| | T x b | L | W kg. | t x b | L | W kg. |
| 1 | 5 x 50 | 900 | 1.75 | 5 x 50 | 900 | 1.75 |
| 2 | 5 x 50 | 900 | 1.75 | 5 x 50 | 900 | 1.75 |
| 3 | 5 x 50 | 860 | 1.67 | 5 x 50 | 860 | 1.67 |
| 4 | 5 x 50 | 810 | 1.57 | 5 x 50 | 810 | 1.57 |
| 5 | 5 x 50 | 760 | 1.47 | 5 x 50 | 760 | 1.47 |
| 6 | 5 x 50 | 710 | 1.38 | 5 x 50 | 710 | 1.38 |
| 7 | 5 x 50 | 660 | 1.28 | 5 x 50 | 660 | 1.28 |
| 8 | 5 x 50 | 610 | 1.18 | 5 x 50 | 610 | 1.18 |
| Aux. Spring | 20 x 2¢ | 560 | 2.71 | 15.6 x 50 | 560 | 3.03 |

The total weight becomes 14.76 kg. in case where round bar steel is used for the auxiliary springs while the corresponding weight is 15.35 kg. in case where flat steel is used. In these cases, the spring constants $kn = 5.5$ and $kn + h = 17.1$, and the load whereby the auxiliary springs first come in contact with the main spring becomes 350 kg. and the load whereby the auxiliary springs completely and thoroughly come in contact with the main spring becomes 1190 kg. Thus the spring provided with the round bar steel auxiliary springs is lighter than that provided with the flat steel auxiliary spring. In practice, because of the fact that such a flat steel as of 50 x 15.6 is unavailable, but a flat steel of 50 x 8 may be used, 8 being the maximum thickness, and requires a lamination of several sheets, the spring becomes still heavier.

In FIGS. 5 through 8, another embodiment of this invention is illustrated where an auxiliary spring comprises two round bar steel springs, each having lateral vertical flat sides. While the main spring 21 comprises a number of leaf springs 21b quite similarly to the preceding example, the flat-sided round bar steel springs 43 of the auxiliary spring differs somewhat from the preceding example. The flat-sided round bar steel springs 43 vertically have less curvature than the curvature of the leaf springs 21b of the main spring 21. Both ends of the flat-sided round bar steel spring 43 are tapered horizontally at the lower side 25 whereby the auxiliary spring is made more easily deflectable when it becomes into contact with the lower-most leaf spring 27 of the main spring 21. The two flat-sided round bar steel springs 43 are arranged longitudinally side by side with a space between. The center of the auxiliary spring is provided with a holding piece 47 which is welded to the flat-sided round bar steel springs 43. A center bolt 49 is provided extending through the leaves 21b of the main spring 21 and the holding piece 47 with a nut 29b thereon so as to secure the flat-sided round bar steel spring 43 in contact with the central bottom surface of the lowermost leaf spring 27. Clips 53 are provided at the inner ends of the tapered parts 25 of the auxiliary springs 43, respectively. The clip 53 is a top-opened rectangular member adapted to surround the main spring 21. An upstanding stud 51 is fixed to the clip 53 at the center thereof. The top of the stud 51 is extended laterally as an integral spacer 55. The lateral ends of the spacer 55 are welded to the auxiliary springs 43, respectively. The tops of the clip 53 are extended upwards above the main spring 21 where the top ends are connected with each other by means of a pin 59. By virtue of this, the two flat-sided round bar steel springs 43 are spaced properly with each other. It is to be noted that there is a clearance between the clip 53 and the main spring 21.

This embodiment also will now be compared with the prior art. If a spring constant required for the auxiliary spring is 2 $kn$ and the suffix for the flat steel is $f$ and for this embodiment is $s$, $$kn = 3EI_f/L^3 \quad (6)$$

in case of flat steel as (1) and (6), and $$kn = 3E \times 2I_s/L^3 \quad (10)$$

in case of this embodiment. From (6) and (10)

$$I_f = 2I_s$$

Hence $$b_f t_f^3/12 = 2 \times b_s^3 t_s/12$$

Hence $$b_f t_f = 2b_s/t_s \quad (11)$$

The weights will now be compared with each other by comparing volumes:

The volume of the flat steel, $$V_f = t_f b_f L$$

and the volume of the flat sided round bar steel, $$V_s = 2b_s t_s L$$

Hence $$V_f/V_s = t_f b_f/2b_s t_s \quad (12)$$

From (11) and (12)

$$V_f/V_s = 2b_s^3 t_s/(t_f^2 \times 2b_s t_s) = b_s^2/t_f^2 \quad (13)$$

Now the minimum value for the breadth $b$ of the flat steel is 45 mm. and the minimum value for the thickness $t$ of the same is 16 mm. Therefore, the Equation 13 is calculated as $$V_f V_s \geq (45/16)^2 = 7.9$$

whereby it is seen that the flat-sided round bar steel spring is far lighter than the flat steel spring, the flat side of the former being arranged vertically. Practically speaking, the desired rigidity is satisfied only by laminating a number of leaves. In view of this, the flat-sided round bar steel is still more advantageous. Furthermore, since $b > t$, in case of the flat-sided round bar steel, $I_s = b_s^3 t_s/12$ so that it is readily possible to obtain a leaf having a high rigidity.

It is most rational and effective for lightening a spring that the stress of the auxiliary spring be utilized to the same extent with the stress of the main spring in a progressive spring, so that the flat steel leaves are, however, used even if the flat side of the flat-sided round bar steel spring is arranged vertically and made to have a high rigidity. By virtue of such an arrangement it is possible to obtain a progressive leaf spring which satisfies a desired load characteristic.

In FIG. 10, some load characteristics are plotted in which the curve K represents a usual main spring which is not accompanied by an auxiliary spring. A truck provided with such a spring does not have comfortable riding qualities when unloaded. The curve M represents an improved usual progressive spring which does not bear the maximum load in view of stress. In this case, a rubber spring is also provided for a larger load than a point $m$ in that curve. If the rubber spring is not provided, the curve M extends towards the curve L. The curve P represents this embodiment which is similar to but better than the curve M.

The weights of these springs are compared with each other as folows:

In case of the usual spring represented by the curve K, $t \times b \times n$ _____ 8 x 70 x 9
W kg. _____ 32.49 kg.

In case of a usual spring provided with a rubber helper represented by the curve M, $t \times b \times n$ _____ $\begin{cases} 7 \times 70 \times 4 \\ 6 \times 70 \times 2 \\ 9 \times 70 \times 2 \end{cases}$ +rubber helper.

W kg. _____27.95 kg.+rubber helper.

In case of this embodiment represented by the curve P, $t \times b \times n$ _____ $\begin{cases} 7 \times 70 \times 5 \\ 45 \times 8 \times 2 \end{cases}$
W kg. _____ 25.48 kg.

The above indicates that the weight of this embodiment represented by the curve P in FIG. 10 is 78.5 percent of the weight of the usual spring represent by the curve K and 91 percent of that of the spring represented by the curve M which additionally requires a rubber helper. The cost of this embodiment therefore is inexpensive by virtue of the considerable lightening.

While particular embodiments of this invention have been illustrated and described, modifications thereof will readily occur to those skilled in the art. It should be understood therefore that the invention is not limited to the particular arrangements disclosed but that the appended claims are intended to cover all modifications which do not depart from the true spirit and scope of the invention.

What is claimed as new and desired to be secured by Letters Patent of the United States is:

1. A spring device comprising
   a main spring member having a plurality of laminated spring leaves with an initial upward curvature between their ends,
   an auxiliary spring member having a lesser initial curvature between its ends than said spring leaves and being connected at its center to the center of said main spring member and in contact with the central bottom surface of the lowermost leaf of said spring leaves at the center, said auxiliary spring member comprising a plurality of parallel horizontally spaced bar steel springs extending longitudinally with respect to lowermost leaf, said bar steel springs at a plurality of locations including contiguous to their ends having members for retaining said bar steel springs in spaced relation and from displacement.

2. A spring device as defined in claim 1 in which said bar steel springs have horizontally tapered ends beyond said last members.

3. A spring device as defined in claim 1 in which said bar steel springs are round bars.

4. A spring device as defined in claim 2 in which said bar steel springs are round bars having longitudinal vertical flat sides.

References Cited by the Examiner

UNITED STATES PATENTS

| | | | |
|---|---|---|---|
| 1,549,455 | 8/1925 | Cox | 267—47 |
| 1,603,564 | 10/1926 | Vesely | 267—45 |
| 2,861,798 | 11/1958 | Lenet et al. | 267—45 |
| 3,053,527 | 9/1962 | Hallam | 267—47 |

ARTHUR L. LA POINT, *Primary Examiner.*

R. M. WOHLFARTH, *Assistant Examiner.*